Patented Sept. 27, 1949

2,483,141

UNITED STATES PATENT OFFICE 2,483,141

PROCESS FOR PRODUCING DIALKYL-CARBAMIC-ACID ESTERS OF DIALKYL-AMINO-ETHANOLS

John F. Mahoney, Linden, N. J., assignor to Merck & Co., Inc., Rahway, N. J., a corporation of New Jersey No Drawing. Application July 19, 1947,
Serial No. 762,195

12 Claims. (Cl. 260—482)

This invention relates to the preparation of new and useful choline derivatives and, more particularly, to a novel and improved process for the synthesis of choline dialkyl urethanes and related compounds from readily available materials.

The valuable pharmacological properties of certain choline derivatives such as the carbamic acid esters of compounds of the choline type have been described in the U. S. Patent No. 2,408,893.

The choline dialkyl carbamates and similar compounds may be represented by the general formula

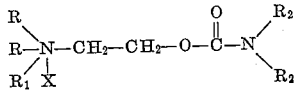

wherein R is a lower alkyl group, $R_1$ is selected from the group consisting of lower alkyl groups and the radical R, $R_2$ is an alkyl group and X is an anion.

I have now discovered an improved process for the preparation of pharmacologically active choline derivatives. In accordance with the invention herein disclosed, dialkyl carbamates, intermediates in the preparation of choline carbamates and similar compounds are formed by reacting dialkylamino alcohols with dialkyl carbamyl chlorides. The amino alcohols and carbamyl chlorides used for preparing the dialkyl carbamates are prepared by any suitable process. Thus, dimethyl amino ethanol can be prepared by reacting dimethylamine with ethylene oxide. A dibutyl carbamyl chloride is obtained by reacting dibutylamine with phosgene dissolved in xylene.

In carrying out the present process in a preferred manner, dibutyl carbamyl chloride is refluxed with dimethylaminoethanol in the presence of pyridine. The resulting solution is evaporated and the residue dissolved in ice water. The aqueous solution is then acidified with a mineral acid and extracted with ether. Upon purification and concentration of the ether solution, β-(dimethylamino) ethyl N,N,dibutyl carbamate is isolated as a colorless liquid.

In the preparation of choline carbamate derivatives, the carbamates such as the β-(dimethylamino) ethyl N,N,dibutyl carbamate are reacted with methyl halides or sulfates. By adding methyl iodide to a solution of β-(dimethylamino) ethyl N,N,dibutyl carbamate in benzene, choline iodide dibutyl carbamate is formed and can be isolated as a heavy white powder, M. P. 82–84.

If desired higher alkyl halides can be used in the process. Ethyliodide, for example, reacts with β-(dimethylamino) ethyl N,N,dibutyl carbamate to yield β-(dimethyl ethyl ammonium iodide) ethyl di-n-butyl carbamate.

The following examples illustrate methods of carrying out the present invention, but it is to be understood that these examples are given by way of illustration and not of limitation.

EXAMPLE I

Dimethylaminoethanol

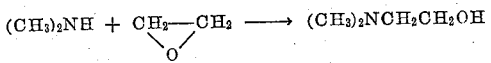

A solution of dimethylamine was prepared by adding 500 g. of sodium hydroxide to 394.8 g. (4.85 moles) of dimethylamine hydrochloride in 700 cc. of methanol and evaporating to dryness. The distillate was collected in a flask, cooled in Dry Ice. To it was added 256 g. (5.82 moles) of ethylene oxide at −20°. The mixture was warmed to 0°, at which point a vigorous reaction set in. The temperature was kept below 20° by immersing at intervals in a Dry Ice bath. When the temperature no longer rose of its own accord the reaction was completed. The methanol solution was dried with potassium carbonate and fractionated at atmospheric pressure. The yield was 228.0 g. of dimethylaminoethanol, B. P. 130–2°. Calculated for $C_4H_{11}ON$; C, 53.91; H, 12.45. Found: C, 53.63; H, 12.34.

EXAMPLE II

Dibutylcarbamyl chloride $(C_4H_9)_2NH + COCl_2 \rightarrow (C_4H_9)_2NCOCl$

In a 2 l. flask, 900 cc. of xylene was cooled to −10° and 147.2 g. of phosgene (1.49 moles) added. A solution of 257 g. of di-n-butylamine (1.99 moles) in 515 cc. of xylene was added slowly, with vigorous stirring, maintaining the temperature below +10° C. The pasty reaction mixture was stirred sixteen hours at 25° C. and the dibutylamine hydrochloride filtered off, washed with xylene and dried. The recovery was 162.8 g. of dibutylamine hydrochloride.

The filtrate and washings were concentrated under reduced pressure and the liquid residue fractionated. At 2 mm. 167.5 g. of dibutylcarbamyl chloride, 0.875 mole, distilled at 87–9°. Calculated for $C_9H_{15}NOCl$; C, 56.41; H, 9.47; N, 7.31. Found: C, 57.16; H, 9.45; N, 7.50.

EXAMPLE III

β-(dimethylamino) ethyl N,N,dibutyl carbamate

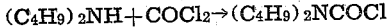

A mixture of 167.5 g. of dibutylcarbamyl chloride (0.875 mole), 65.5 g. of dimethylaminoethanol (0.960 mole), and 437 cc. of anhydrous pyridine was refluxed three hours. The red solution was evaporated to dryness, then dissolved in 400 cc. of ice water, adding sufficient hydrochloric acid to lower to pH 3. The solution was washed with 4×200 cc. of ether, then made strongly alkaline with sodium carbonate and extracted with 4×200 cc. of ether. The ether extract was dried over magnesium sulfate and charcoaled. The pale yellow filtrate was concentrated under vacuum to yield 164 g. of liquid residue, which was fractionated under vacuum. At 2 mm. 137.4 g. of β-(dimethylamino) ethyl N,N,dibutyl carbamate, 0.563 mole, a colorless liquid, distilled undecomposed at 128–30°. Calculated for $C_{13}H_{28}N_2O_2$: C, 63.90; H, 11.55; N, 11.46. Found: C, 64.01; H, 11.30; N, 11.74.

Example IV

*Choline iodide dibutyl carbamate*

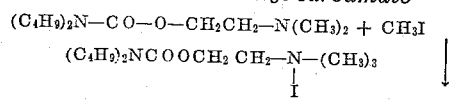

To a solution of 15.0 g. of β-(dimethylamino) ethyl N,N,dibutyl carbamate (0.0614 mole) in 75 cc. of benzene was added 4.5 cc. of methyl iodide (10.3 g., 0.0726 mole). The temperature was kept below 30° by occasional immersion in an ice bath. After one hour, 750 cc. of anhydrous ether were added, forming a dense white precipitate. After sixteen hours at 0°, the product was filtered off, washed thoroughly with anhydrous ether and dried under vacuum at room temperature in a desiccator. Calculated for $C_{14}H_{31}N_2O_2I$: C, 43.53; H, 8.09; N, 7.26. Found: C, 43.82; H, 7.91; N, 7.03. The product was a heavy white powder, only slightly hygroscopic which yellowed gradually on exposure to light and air, M. P. 82–84°.

Example V

*β-(dimethyl ethyl ammonium iodide) ethyl di-n-butyl carbamate*

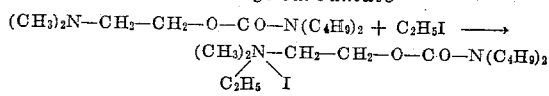

A mixture of 100.0 g. of β-(dimethylamino) ethyl N,N,dibutyl carbamate (0.410 mole) and 188 cc. of ethyl iodide (363 g., 2.32 moles) was held at 25° for two hours. Occasional cooling with an ice bath was necessary during the first half hour. With stirring, 1600 cc. of anhydrous ether was then added. After standing overnight, the product was filtered off, washed thoroughly with anhydrous ether and dried in vacuum over sulfuric acid. The yield was 162.5 g. of heavy white crystalline powder, M. P. 76–77°. The product yellowed with light and was hygroscopic. Analysis: Calculated for $C_{15}H_{33}O_2N_2I$: C, 45.00; H, 8.31; N, 7.00. Found C, 45.42; H, 8.20; N, 7.08.

Example VI

*β-(dimethyl ethyl ammonium sulfate)-ethyl di-n-butyl carbamate*

A mixture of 10.0 g. of β-(dimethylamino) ethyl N,N,dibutyl carbamate (0.0408 mole), 12.6 g. of diethyl sulfate (0.0818 mole), and 50 cc. of anhydrous ether was refluxed overnight. Product began to separate out in a few hours. At the end of the heating period, the mixture reacted neutral. The product was filtered off, washed with ether, and recrystallized from 50 cc. of carbon tetrachloride. The yield was 13.7 g., 83%. Analysis: Calculated for $C_{17}H_{38}O_6N_2$: C, 51.23; H, 9.61; N, 7.03. Found: C, 51.56; H, 9.10; N, 7.03.

β-(dimethyl ethyl ammonium sulfate)-ethyl di-n-butyl carbamate is a white crystalline solid, M. P. 78–80.5°. It is hygroscopic and its water solution is neutral.

I claim:

1. The process for the preparation of choline iodide dibutyl carbamate which comprises refluxing dimethylaminoethanol with dibutyl carbamyl chloride in the presence of pyridine and reacting the resulting β-(dimethylamino) ethyl N,N,dibutyl carbamate with methyl iodide at a temperature below 30° C.

2. The process for the preparation of β-(dimethylamino) ethyl N,N,dibutyl carbamate which comprises refluxing dibutyl carbamyl chloride with dimethylaminoethanol in the presence of pyridine.

3. The process for the preparation of choline iodide dibutyl carbamate which comprises reacting a solution of β-(dimethylamino) ethyl N,N,-dibutyl carbamate in benzene with methyl iodide at a temperature below 30° C.

4. The process for the preparation of compounds having the formula:

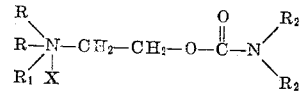

wherein R and $R_2$ are lower alkyl groups and $R_1$ is selected from the group consisting of the radical R and lower alkyl groups differing from R and X is an anion selected from the group consisting of halogen and sulfate radicals, which comprises heating a lower dialkyl amino ethanol with a lower dialkyl carbamyl chloride in the presence of pyridine and subjecting the resulting β-lower dialkyl amino ethyl N,N lower dialkyl carbomate to the action of a reagent selected from the group consisting of lower alkyl halides and lower alkyl sulfates.

5. The process for the preparation of compounds having the formula:

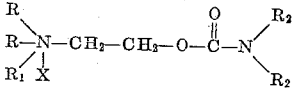

wherein R and $R_2$ are lower alkyl groups and $R_1$ is selected from the group consisting of the radical R and lower alkyl groups differing from R and X is an anion selected from the group consisting of halogen and sulfate radicals, which comprises refluxing a lower dialkyl amino ethanol with a lower dialkyl carbamyl chloride in the presence of pyridine and subjecting the resulting β-lower dialkyl amino ethyl N,N lower dialkyl carbamate to the action of a reagent selected from the group consisting of lower alkyl halides and lower alkyl sulfates.

6. The process for the preparation of a compound having the formula:

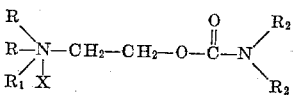

wherein R and $R_2$ are lower alkyl groups and $R_1$ is selected from the group consisting of the radical R and lower alkyl groups differing from R and X is halide which comprises refluxing a lower dialkyl amino ethanol with a lower dialkyl carbamyl chloride in the presence of pyridine and reacting the resulting β-lower dialkylamino ethyl N,N lower dialkyl carbamate with a lower alkyl halide at a temperature below 30° C.

7. The process for the preparation of a compound having the formula:

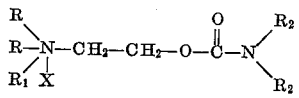

wherein R and R₂ are lower alkyl groups and R₁ is selected from the group consisting of the radical R and lower alkyl groups differing from R and X represents sulfate, which comprises refluxing a lower dialkyl amino ethanol with a lower dialkyl carbamyl chloride in the presence of pyridine and refluxing the resulting β-lower dialkylamino ethyl N,N lower dialkyl carbamate with a lower alkyl sulfate.

8. The process for the preparation of a compound having the formula:

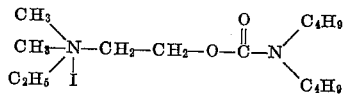

which comprises refluxing dimethyl amino ethanol with a dibutyl carbamyl halide in the presence of pyridine and reacting the resulting dimethyl amino ethyl N,N dibutyl carbamate with ethyl iodide at a temperature below 30° C. and recovering β-(dimethyl ethyl ammonium iodide ethyl N,N-dibutyl carbamate.

9. The process for the preparation of a β-lower dialkyl amino ethyl, N,N-lower dialkyl carbamate which comprises refluxing a lower dialkyl amino ethanol with a lower dialkyl carbamyl halide in the presence of pyridine.

10. The process for the preparation of a β-lower dialkyl ethyl ammonium halide ethyl N,N-lower dialkyl carbamate which comprises reacting β-lower dialkyl amino ethyl N,N-lower dialkyl carbamate with an ethyl halide at a temperature below 30° C.

11. The process for the preparation of a β-lower dialkyl ethyl ammonium iodide ethyl N,N-lower dialkyl carbamate which comprises reacting β-lower dialkyl amino ethyl N,N-lower dialkyl carbamate with ethyl iodide at a temperature below 30° C.

12. The process for the preparation of a β-lower dialkyl ethyl ammonium sulfate ethyl N,N-lower alkyl carbamate which comprises refluxing β-lower dialkyl amino ethyl N,N lower dialkyl carbamate with diethyl sulfate.

JOHN F. MAHONEY.

REFERENCES CITED

The following references are of record in the file of this patent:

UNITED STATES PATENTS

| Number | Name | Date |
|---|---|---|
| 1,894,162 | Dalmer | Jan. 10, 1933 |

FOREIGN PATENTS

| Number | Country | Date |
|---|---|---|
| 551,777 | Germany | June 14, 1932 |
| 553,148 | Germany | June 23, 1932 |

OTHER REFERENCES

Swan, Jour. Ophth. 27, No. 9, page 937.